United States Patent
Marsaud (10) Patent No.: US 11,308,473 B2
(45) Date of Patent: Apr. 19, 2022

(54) DEVICE FOR DETERMINING A TRANSACTIONAL DEVICE, CORRESPONDING METHOD AND COMPUTER PROGRAM

(71) Applicant: BANKS AND ACQUIRERS INTERNATIONAL HOLDING, Paris (FR)

(72) Inventor: Thierry Marsaud, Talence (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 0 days.

(21) Appl. No.: 17/048,765

(22) PCT Filed: Apr. 11, 2019

(86) PCT No.: PCT/EP2019/059346
§ 371 (c)(1),
(2) Date: Oct. 19, 2020

(87) PCT Pub. No.: WO2019/201754
PCT Pub. Date: Oct. 24, 2019

(65) Prior Publication Data
US 2021/0150503 A1 May 20, 2021

(30) Foreign Application Priority Data

Apr. 20, 2018 (FR) ...................................... 1853526

(51) Int. Cl.
*G06Q 20/20* (2012.01)
*G06Q 20/32* (2012.01)
(Continued)

(52) U.S. Cl.
CPC .......... *G06Q 20/204* (2013.01); *G06F 9/451* (2018.02); *G06K 9/00375* (2013.01); *G06N 3/04* (2013.01);
(Continued)

(58) Field of Classification Search
CPC ............. G06Q 20/204; G06Q 20/3278; G06Q 20/341; G06Q 20/352; G06Q 20/32;
(Continued)

(56) References Cited

U.S. PATENT DOCUMENTS 7,757,942 B1 * 7/2010 Ford, Sr. ............... G07F 7/0873
235/380
9,411,988 B2 8/2016 Berthiaud et al.
(Continued)

FOREIGN PATENT DOCUMENTS

CA       3065686 A1 *  6/2020  ............ G06F 21/75
CN     112163863 B  *  3/2021
(Continued)

OTHER PUBLICATIONS

Li, Haoyu et al. "Tap-Wave-Rub: Lightweight Malware Prevention for Smartphones Using Intuitive Human Gestures." Proceedings of the Sixth ACM Conference on Security and Privacy in Wireless and Mobile Networks. ACM, 2013. 25-30. Web. (Year: 2013).*
(Continued)

*Primary Examiner* — Ashford S Hayles
(74) *Attorney, Agent, or Firm* — David D. Brush; Westman, Champlin & Koehler, P.A.

(57) ABSTRACT

A device and a method for determining a transactional device used for a transaction. More particularly, the device includes a data processor, a memory, an optical sensor, and a set of transactional interfaces. The method includes: obtaining at least one recording coming from the optical sensor), the recording being obtained when a user holds the
(Continued)

transactional device in hand; determining at least one confidence score, the at least one confidence score being associated with at least one corresponding input of a structure of data for activating transactional interfaces present within the electronic device; and activating at least one transactional interface associated with the at least one input as a function of the at least one confidence score.

10 Claims, 4 Drawing Sheets

(51) Int. Cl.
    *G06Q 20/34*         (2012.01)
    *G06F 9/451*         (2018.01)
    *G06K 9/00*          (2006.01)
    *G06N 3/04*          (2006.01)

(52) U.S. Cl.
    CPC ....... *G06Q 20/3278* (2013.01); *G06Q 20/341* (2013.01); *G06Q 20/352* (2013.01)

(58) Field of Classification Search
    CPC ...... G06Q 20/34; G06Q 20/356; G06Q 20/20; G06F 9/451; G06K 9/00375; G06K 2209/25; G06K 9/00442; G06K 9/2054; G06N 3/04; G06N 3/02; G06N 5/04; G06N 7/005; G07F 7/0873; G07F 7/088; G07F 7/0893
    See application file for complete search history.

(56) References Cited

U.S. PATENT DOCUMENTS

| | | | | |
|---|---|---|---|---|
| 10,068,251 | B1* | 9/2018 | Scofield | G06Q 30/0255 |
| 10,146,966 | B2 | 12/2018 | Naccache et al. | |
| 2012/0104094 | A1 | 5/2012 | Chrolovich et al. | |
| 2013/0046603 | A1* | 2/2013 | Grigg | G06Q 30/0261 |
| | | | | 705/14.25 |
| 2014/0279528 | A1* | 9/2014 | Slaby | H04L 63/0853 |
| | | | | 705/44 |
| 2014/0287683 | A1* | 9/2014 | Rankl | G06Q 30/0601 |
| | | | | 455/41.1 |
| 2015/0317066 | A1* | 11/2015 | Saxena | H04M 1/27475 |
| | | | | 715/739 |
| 2015/0317748 | A1* | 11/2015 | Roberts | G06Q 20/12 |
| | | | | 705/30 |
| 2015/0347789 | A1 | 12/2015 | Berthiaud et al. | |
| 2018/0033000 | A1 | 2/2018 | Liu | |
| 2020/0356984 | A1* | 11/2020 | Wilson | G06Q 20/3574 |
| 2021/0374391 | A1* | 12/2021 | Jorasch | G06K 9/00335 |

FOREIGN PATENT DOCUMENTS

| | | | | |
|---|---|---|---|---|
| CN | 113259866 | A * | 8/2021 | |
| EP | 2128789 | A1 | 12/2009 | |
| EP | 3879478 | A1 * | 9/2021 | |
| FR | 3000263 | A1 | 6/2014 | |
| JP | 2010198243 | A * | 9/2010 | |
| JP | 2021068466 | A * | 4/2021 | |
| KR | 20070103724 | A * | 10/2007 | ............ G07C 9/257 |
| KR | 20210064886 | A * | 6/2021 | |
| WO | 2015158621 | A1 | 10/2015 | |
| WO | WO-2021192061 | A * | 9/2021 | |
| WO | WO-2021192375 | A1 * | 9/2021 | |

OTHER PUBLICATIONS

Liébana-Cabanillas, Francisco, Iviane Ramos de Luna, and Francisco Montoro-Rios. "Intention to Use New Mobile Payment Systems: a Comparative Analysis of SMS and NFC Payments." Ekonomska istraživanja 30.1 (2017): 892-910. Web. (Year: 2017).*
Paik, Jaehyon et al. "Predicting User Performance and Learning in Human-Computer Interaction with the Herbal Compiler." ACM transactions on computer-human interaction 22.5 (2015): 1-26. Web. (Year: 2015).*
Chen, Phoebus et al. "A Low-Bandwidth Camera Sensor Platform with Applications in Smart Camera Networks." ACM transactions on sensor networks 9.2 (2013): 1-23. Web. (Year: 2013).*
English translation of the Written Opinion of the International Searching Authority dated May 17, 2019 for corresponding International Application No. PCT/EP2019/059346, filed Apr. 11, 2019.
International Search Report and Written Opinion dated May 9, 2019 for corresponding International Application No. PCT/EP2019/059346, filed Apr. 11, 2019.

* cited by examiner

DEVICE FOR DETERMINING A TRANSACTIONAL DEVICE, CORRESPONDING METHOD AND COMPUTER PROGRAM

CROSS-REFERENCE TO RELATED APPLICATIONS

This Application is a Section 371 National Stage Application of International Application No. PCT/EP2019/059346, filed Apr. 11, 2019, which is incorporated by reference in its entirety and published as WO 2019/201754 A1 on Oct. 24, 2019, not in English.

1. FIELD OF THE INVENTION

The field of the invention is that of card reader devices.

More specifically, the invention relates to a technique for selecting a communications mode to be used to communicate with a transactional device (a card, a watch-type terminal or a smartphone).

The invention has numerous applications such as for example in the field of e-payment systems or monetics (i.e. bank payment terminals) or travel tickets.

More generally, it can be applied in all cases requiring optimal communication with a card.

2. TECHNOLOGICAL BACKGROUND

We shall strive more particularly here below in this document to describe the problems and issues existing in the field of bankcards, that the inventors have confronted. The invention is naturally not limited to this particular field of application but is of interest for any smartcard reading technique that has to confront proximate or similar problems and issues.

The EMVco (Europay, MasterCard, Visa and co.) standard stipulates the possibility that a smartcard and a terminal may possess a plurality of communications modes. Thus, a terminal (such as a payment terminal or a simple card reader) can include different communications means requiring physical contact with a card (for example through a magnetic track or a micro-module called a chip), as well as different contactless communications means (compatible with NFC (near-field communications) or RFID (radiofrequency identification) related standards which work in a separated manner.

Thus, such a terminal or such a reader must be capable, depending on the device presented to it, of selecting the appropriate mode of communications (and therefore the corresponding communications means) to make a transaction.

Classically, when the card presented is inserted into a first reader slot of the terminal, the terminal implicitly selects first contact-based means of communications (via a micro-module). When the card presented is inserted into a second reader slot of the terminal, comprising a magnetic head, the terminal implicitly selects second contact-based communications means (magnetic reader head). Finally, when the presented card is in proximity (by a distance of an order of some centimeters) to a transmitter of a contactless communications module (and more specifically in the radiating zone of such a transmitter) and when the card transmits a response following the activation of contactless communications means addressed to the device, this device selects a contactless communications module to communicate with the card presented.

Thus, to enable such a selection, the contactless communications means of the device are often activated permanently (or else they are activated at regular intervals, as for example in the patent application US20120104094, in which the contactless communications means are used by transmitting short pulses to try and detect the presence of a card).

Now, when a user intends to insert a combined card (i.e. a card comprising a contact-based communications module as well as one that is contactless) in the first or second reader slot, it can happen that he places the combined card in proximity to the transmitter of the device during this phase of approaching one of the slots, and that the combined card undertakes a transaction before it is positioned in one of the slots. The terminal can then generate an error because it is generally not authorized to simultaneously process two "readings" of cards. Thus, when this combined card passes in proximity to the contactless transmitter of the device, the energy given by the electromagnetic field of the transmitter of the device activates the contactless communications means of the combined card. Then, the combined card transmits a piece of information specifying that it can carry out an electronic transaction, via the contactless communications means. It is upon the reception by the device of such a piece of information that the overall time of a transaction is monitored by the device. Thus, one drawback of such a technique lies in the fact that, to an overall time of a transaction, there is added an additional time resulting from the activation and the sending, by the combined card, of a piece of information specifying that it can carry out an electronic transaction via the contactless communications means.

Another drawback related to a permanent activation of a contactless communications module of the terminal lies in the fact that the terminal needs a substantial energy supply (resulting from the excess consumption induced by the permanent working of a contactless communications module of the device), and this leads to constraints of sizing of the power supply of such a device as well as problems of heating and autonomy for portable terminals.

Another drawback related to this operational mode is that novel payment means (for example smartphones, connected watches, etc.) have made an appearance and that the way to manage transactions with these types of terminals can be different from that of classic payment means (payment cards). It is therefore necessary to have available a device that is capable of proposing solutions to these different means and ways of making payment. The patent document FR1262728 discloses a method in which a sensor detects the position of a card in order to activate or not activate a contactless communications interface. Such a method however is limited to a detection of presence (or absence) and is not necessarily suited to novel payment uses, especially by means of the terminals mentioned earlier or again by means of loyalty accounts (what are called "loyalty" cards) when they are subjected to particular processing operations not anticipated in FR1262728 which, whatever the means described, is limited to proposing a card detection. Hence, despite the technique described in FR1262728, including especially the use of an optical sensor for the detection of presence, it remains necessary for the manager of the device (for example the merchant) to carry out a certain number of selection operations on the device in order to enable payment, and this can therefore slow down the transactional process in question.

3. SUMMARY OF THE INVENTION

The inventors have taken account of the problems and issues posed by prior-art devices in order to propose a novel technique for identifying transactional devices (cards, communications terminals) that enables automatic switching over to a mode suited to the transactional device.

In one particular embodiment of the invention, a method is proposed for determining a type of transactional device used to carry out a transaction, a method implemented by an electronic device comprising a data processor, a memory and an optical sensor. Such a method comprises:

a step for obtaining at least one recording coming from the optical sensor, said recording being obtained when a user holds said transactional device in hand;

a step for determining at least one confidence score, said at least one confidence score being associated with at least one corresponding input of a structure of data for activating transactional interfaces that are present within said electronic device;

at least one step for activating at least one transactional interface associated with said at least one input as a function of said at least one confidence score.

Thus, the invention enables the determining of an order of activation of the transactional interfaces of the terminal, as a function of what has been perceived by this terminal. The invention therefore secures the transaction on the one hand by making sure that only one interface is activated at a time and on the other hand by determining, as efficiently as possible, the intention of the user who is holding the transactional device in his hand.

According to one particular characteristic, a confidence score is a value representative of a probability of a intent to use a given transactional interface on the part of the user holding said transactional device in hand.

Thus, the invention allows the user a certain latitude in not accidentally locking the terminal on a given interface whereas it has not been selected by the user.

According to one particular embodiment, the determining of a confidence score $P_{SC}$ associated with an input of a structure of decision data comprises at least one of the following steps:

determining a confidence score $P1_{SC}$ associated with the number of finger portions present on at least one recording coming from the optical sensor;

determining a confidence score $P2_{SC}$ associated with at least one characteristic of a transactional device.

Thus, the confidence score is multifaceted. It therefore has the advantage of integrating several parameters in its composition and of therefore being less sensitive to errors. It can thus deliver more reliable results and therefore enable the activation of the most probable transactional interface.

According to one particular characteristic, the step for determining a confidence score $P1_{SC}$ comprises the following for a current image and for a current input of the structure of data for activating transactional interfaces:

determining a number of finger portions present on said current image, delivering a first value of number of finger portions;

determining a position of finger portions present on said current image, delivering a second value of position of finger portions;

assigning a score to the current input of the structure of data for activating transactional interfaces as a function of the first and second previously determined values.

According to one particular embodiment, the determining of a confidence score $P1_{SC}$ associated with the number of finger portions present on at least one recording coming from the optical sensor implements at least one previously trained neural network.

According to one particular embodiment, the determining of a confidence score $P1_{SC}$ associated with the number of finger portions present on at least one recording coming from the optical sensor implements at least one recognition template.

According to one particular characteristic, the step for determining a confidence score $P2_{SC}$ comprises, for a current image:

pre-processing the current image delivering a pre-processed image;

obtaining, from amongst a set of characteristics, at least one characteristic to be searched for;

searching for said at least one characteristic on said processed image (EnregPT) delivering at least one value representing the presence of said at least one characteristic within said current image.

In another embodiment, the invention also relates to a device for determining a type of transactional device used to carry out a transaction, the device comprising a data processor, a memory and an optical sensor. Such a device comprises:

at least one module for obtaining at least one recording coming from the optical sensor, said recording being obtained when a user holds said transactional device in hand;

a module for determining at least one confidence score, said at least one confidence score being associated with at least one corresponding input of a structure of data for activating transactional interfaces that are present within said electronic device;

a module for activating at least one transactional interface associated with said at least one input as a function of said at least one confidence score.

Such a device can also comprise all the means of implementation of the secondary characteristics presented here above, in the form of dedicated hardware components such as FPGAs or any other appropriate technique.

In one embodiment, such a device is integrated into a payment terminal in order to enable this terminal to select the transactional interface to be activated during a payment transaction. According to one particular embodiment, the device is the payment terminal.

Another embodiment of the invention proposes a computer program product that comprises program code instructions for implementing the above-mentioned method (in any one of its different embodiments) when said program is executed on a computer.

Another embodiment of the invention proposes a computer-readable and non-transient storage medium storing a computer program comprising a set of instructions executable on a computer to implement the above-mentioned method (in any one of its different embodiments).

According to one embodiment, the invention is implemented by means of software and/or hardware components. In this respect, the term "module" may correspond? in this document? equally well to a software component as to a hardware component or to a set of hardware and software components.

A software component corresponds to one or more computer programs, one or more sub-programs of a program or more generally to any element of a program or a software program capable of implementing a function or a set of functions according to what is described here below for the module concerned. Such a software component is executed by a data processor of a physical entity (a terminal, a server, a gateway, a set-top box, a router, etc.) and is capable of accessing the hardware resources of this physical entity (memories, recording supports, communications buses, input/output electronic boards, user interfaces, etc.).

In the same way, a hardware component corresponds to any element of a hardware unit capable of implementing a function or a set of functions according to what is described here above for the module concerned. It may be a programmable hardware component or a component with an integrated processor for the execution of software, for example an integrated circuit, a smartcard, a memory card, an electronic board for the execution of firmware, etc.

4. FIGURES

Other features and advantages of the invention shall appear from the following description, given by way of an indicative and non-exhaustive example and from the appended drawings of which.

5. DETAILED DESCRIPTION

5.1. General Principle

In all the figures of the present document, the identical elements and steps are designated by a same numerical reference.

The general principle of the proposed technique consists in enabling the terminal (for example the payment terminal or any other type of terminal using multiple technologies) to make an automatic selection of the transactional interface to be used depending on the perception, by the terminal, of the gesture made and/or of the transactional device held by the user. For a payment terminal, the technique determines the transactional interface to be used to be able to pay for the user's purchases and thus make the payment operation simpler and speedier, in making it unnecessary for the merchant to select the mode of payment used by the user. More particularly, the terminal is provided with means for recognizing the transactional device (smartcard, contactless card, magnetic card, smartphone, watch) used by the user (to make payment for example) and for doing so automatically, without the merchant's having to take action on the payment terminal.

A method for detecting the means of payment according to the present technique is described here below. This method is based on the determining of a confidence score pertaining to a payment means presented to the payment terminal. A confidence score is determined for a certain number of expected scenarios, each scenario corresponding to a transactional interface to be activated to carry out the transaction: for example one confidence score is attributed to payment by smartcard (transactional interface: smartcard reader), one score for contactless payment (transactional interface: contactless reader), etc. Determining the confidence score is at least partly based on obtaining one or more recordings (images/video) coming from an optical sensor placed on the terminal, for example in proximity to its screen. Images (and/or videos) are obtained, characterized relatively to the expected scenarios (at the transactional interfaces to be activated) and one confidence score is assigned to each transactional interface (depending on the elements present in the recordings). The confidence scores are then used, from the highest value to the lowest value, to selectively activate (one after the other) the transactional interfaces of the terminal.

As a result, several problems previously encountered with prior-art techniques are resolved: the merchant does not act on the terminal to select the payment means; the payment interfaces are not all activated at the same time, thus reducing problems of electrical consumption and problems related to security (consisting in the excessive use of one interface to the detriment of another for example, or even related to more sophisticated methods for theft of personal and confidential data).

Figure 1A:
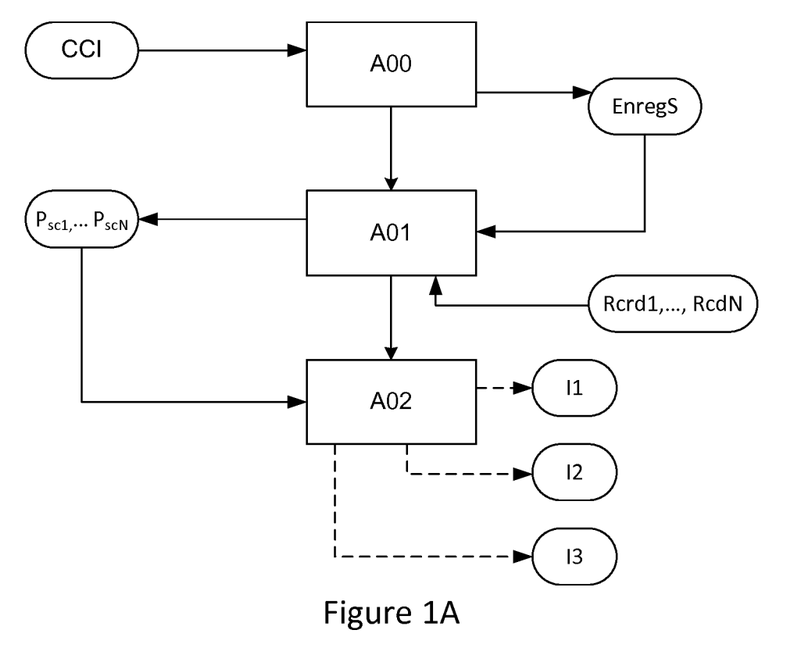
FIG. 1A explains the different steps of the method of characterization.

More particularly, referring to FIG. 1A, the method comprises:

a step for obtaining (A00) at least one recording (EnregS) coming from the optical sensor (CCI), said recording being obtained when a user holds said transactional device in hand;

a step for determining (A01) at least one confidence score ($P_{sc1}, \ldots P_{scN}$), said at least one confidence score ($P_{sc1}, \ldots P_{scN}$) being associated with at least one input (Rcrd1, . . . , RcdN) corresponding to a structure of data for the activation of transactional interfaces present within said electronic device;

at least one step for activating (A02) at least one transactional interface (I1, I2, I3, etc.) associated with said at least one input (Rcrd1, RcdN) as a function of said at least one confidence score ($P_{sc1}, \ldots P_{scN}$).

Within the framework of the present invention, it will be understood that a transactional interface represents either a physical interface for carrying out the transaction (chip, magnetic stripe, contactless interface) or a particular mode of operation of this physical interface (for example contactless card or smartphone using the contactless interface). Within the framework of the present invention, a confidence score ($P_{sc1}, \ldots P_{scN}$) can be the sum (or any other relevant operation such as the multiplication, successive utilization, subtraction or disjunction) of several (components of) intermediate confidence scores, as is disclosed here below: a confidence score associated with a number of finger portions visible on the recordings and/or a confidence score associated with the determining of the transactional device. The determining of the components of the confidence score, when the score is computed in this way, are not necessarily simultaneous or concomitant. A first component can be computed at a certain time and a second component at another time: one of the components can for example serve to exclude the use of an interface while the other component can serve to support the choice of interface therefore affecting the confidence score.

Figure 1B:
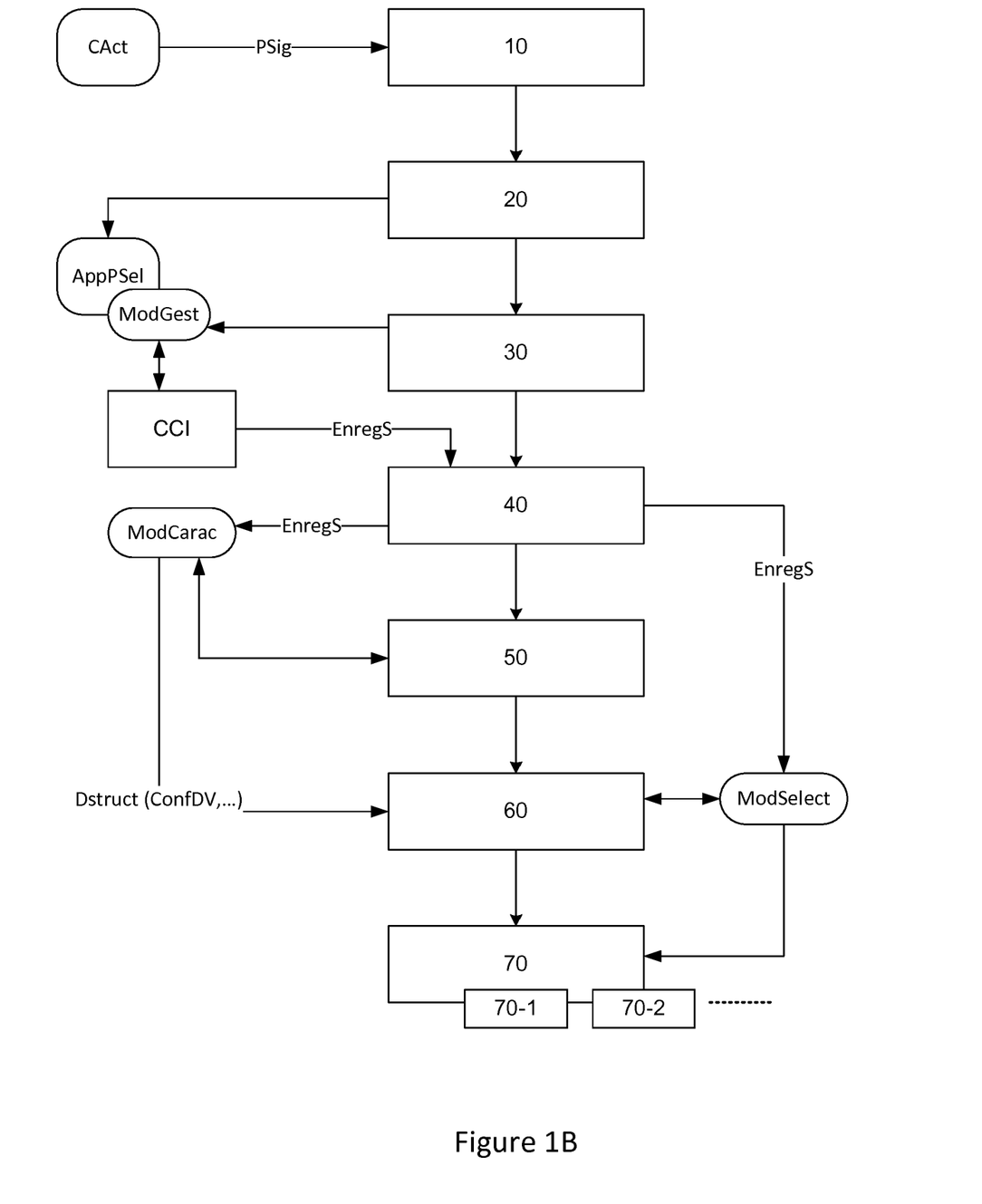
FIG. 1B explains the different steps of the method of characterization, in one particular embodiment.

One method implemented within the framework of this technique, to make a payment, is presented with reference to FIG. 1B in one particular non-exhaustive embodiment. In this example, a disjunctive approach is used. The method starts in this example with a reception (10) within a terminal, coming from an activation component (CAct), of a signal (for example a payment signal) (PSig). The activation component (CAct) can for example be situated physically within a cash register connected to the terminal by means of interface (wired or wireless). The activation component can also be physically situated within a hybrid terminal having both the role of a cash register and the role of a terminal, each of the two roles being exerted by different components (processor, memory) or by common components having different operating logics as a function of the role performed (for example the role of a cash register is performed in non-secure mode while the payment terminal mode is performed in secure mode). Be that as it may, the payment signal is received by the terminal (TPay) and prompts (20) the loading, within the terminal, of an application for selecting a payment mode (AppPSel). This application for selecting a payment mode (AppPSel) comprises a management module (ModGest) for managing an optical component (CCI). The image capturing component (CCI) is positioned on the front face of the payment terminal (i.e. for example in proximity to the display screen of the payment terminal).

Thus, at the reception of the payment signal (PSig), the application for the automatic selection of the payment mode (AppPSel) launches (30) the management module (ModGest) for managing the optical component (CCI). This management module retrieves (40) one or more recordings (EnregS) (depending on the embodiments) coming from the optical component (CCI).

Each recording (image) is transmitted to a characterizing module (ModCarac). The characterizing module (ModCarac) carries out (50), on the received recordings, processing operations for characterizing in which a search is made for the characteristic elements of the payment method that is used by the user to pay for his purchases, in relation with the payment terminal. These characteristic elements comprise especially the presence and/or the position of a payment card, the presence and/or position of a communications terminal (of the smartphone type). More particularly, four scenarios (at least) are searched for and characterized by the characterizing module, corresponding to three transactional interfaces. These four scenarios are described in detail here below: they correspond to four confidence scores ($P_{sc1}, \ldots P_{scN}$) associated with four inputs (Rcrd1, ..., RcdN) of the structure of data for activating transactional interfaces.

The characterizing module (ModCarac) gives (60) the results of the computations made (the components of the confidence scores) to a payment mode selection module (ModSelect) in the form of a data structure (DStruct) (possibly identical with the activation data structure) which includes, for at least one of the four scenarios, a confidence value (ConfDV) (a value that may be strictly equal to the confidence score component previously mentioned, or be adapted according to circumstances by other factors). This confidence value (ConfDV) is represented in the form of a probability (value of 0 to 1). This selection module (ModSelect) inputs the results of the characterization (DStruct) and optionally inputs images (EnregS) of the management module (ModGest) for managing the image sensing component and carries out (70) the selection of the payment mode as a function of the confidence values associated with each possible scenario.

The selection module (ModSelect) has confidence values transmitted by the characterizing module (ModCarac) (for example confidence values derived from the characterization of the number of fingers on the card or again from the position and the orientation of the card). Using images (EnregS) of the management module (ModGest) for managing the image capturing component, the module of the selection (ModSelect) can, as explained here below, try to detect the type of payment means used to refine the confidence score associated with a scenario (and therefore an input of the data structure).

When several examples (probable payment modes) are present in the results coming from the characterizing module (DStruct), the selection module (ModSelect) proceeds by iteration, each iteration corresponding to the activation (70-1, 70-2, etc.) of a payment mode corresponding to an identified scenario. For example, when two potentially contactless scenarios (contactless payment with a confidence score of 0.8 and smartcard payment with a confidence score of 0.6) are identified, the selection module:

commands the activation of the contactless payment module; then goes into waiting for a confirmation of initiation of contactless payment coming from the contactless payment module during a predetermined time.

When the allocated time has elapsed (one second for example) and when no contactless payment procedure has begun:

commands the activation of the smartcard payment module; then goes into waiting for a confirmation of initiation of smartcard payment coming from the appropriate payment module, during a predetermined time (and/or up to the presentation of a smartcard in the smartcard reader of the payment terminal).

Thus, the selection module is capable of managing the different payment interfaces of the payment terminal. As indicated here above, it is thus possible on the one hand to reduce the electricity consumption of these payment devices (particularly substantial when they are mobile and/or nomad devices) and on the other hand to substantially increase the security of the payment terminal and its payment interfaces by not activating the interfaces that do not need to be activated. This implementation in disjunctive form is given purely by way of illustration and shows that it is attempted first of all to determine which means of payment is used (through the characterizing module) and then to try and recognize the payment means (with the selection module). It would have been possible also to carry out these two operations in parallel, by means of the characterizing module, by applying greater computation power.

Thus, a plurality of transactional interfaces can be used. Each interface is computed and assigned a confidence score, which represents a value of probability of the intent to use it (on the part of the user holding the device in his hand). The interfaces can be activated successively in the descending order of their assigned confidence scores. It can also be noted that, should there be one and only one transactional interface available, the method claimed could also be implemented by limiting the activation to only one interface. However, as explained here above, depending on the transactional device recognized (contactless card, NFC communications terminal), the mode of operation of the interface would be immediately recognized, also implying an optimizing of consumption, although potentially to a lesser extent than when the transactional terminal has several transactional interfaces available.

5.2. Detection of the User's Grip on the Payment Means

Among the elements that take part in determining a confidence score for a given payment means, the inventors have especially identified the number of fingers and/or the part of the user's hand present in the images (recordings) coming from the optical component.

Figure 2:
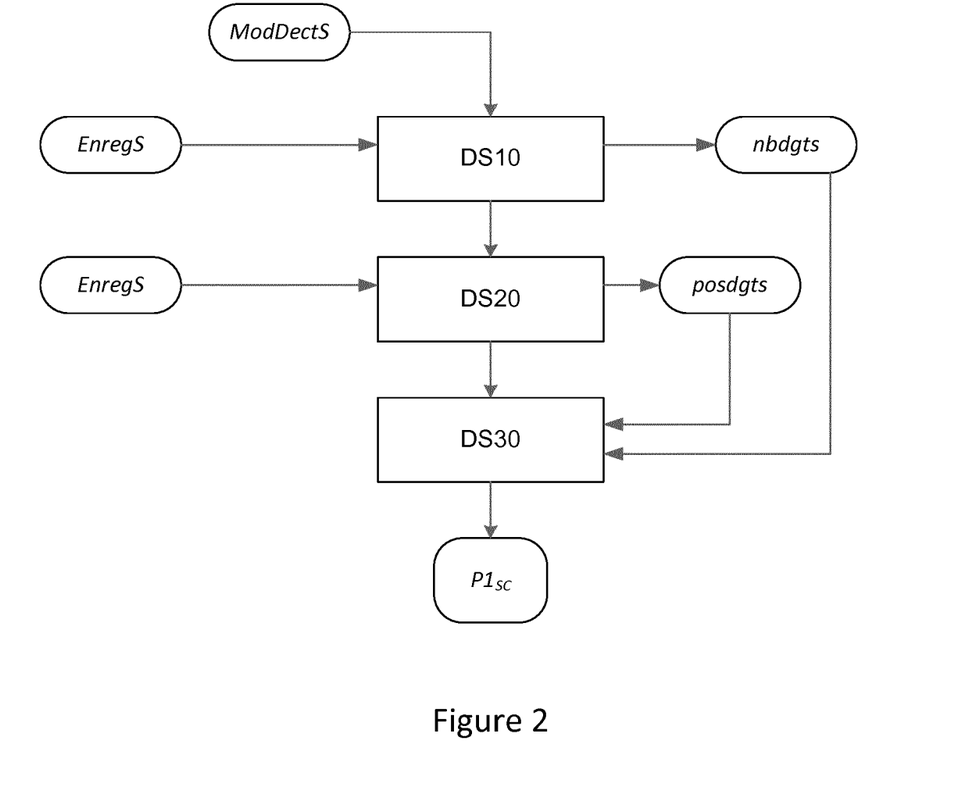
FIG. 2 describes the steps implemented for the recognition of a number of fingers holding the transactional device.

Thus in one embodiment that can be totally or partially combined with (or be independent of) the other embodiments and variants presented, and described with reference to FIG. 2, at least one part $P1_{SC}$ (or even the totality) of the confidence score is computed as a function of the presence and/or the position of one or more fingers or extremities of fingers in the captured image (the images or the video). Indeed, the starting point of the inventors has been the observation that the payment used (or the payment function used in a payment means with multiple technologies) is strongly linked to the position of the user's fingers. Now, although there are morphological differences, chiefly in terms of size, color and shape, the major part of the extremities of the fingers resemble each other to a very great extent, within tolerances that are highly acceptable from the viewpoint of digital processing (especially for example by means of a process involving the use of one or more neural networks). Thus, in this embodiment, a specific detection module (ModDectS) searching for and/or detecting the position of the fingers in one (or more) images is in charge of providing a part $P1_{SC}$ of the confidence score. This part is independent of the detection and/or recognition of the payment means as such.

More particularly, the computation of this part of the confidence score is directly related to the scenarios (and therefore the number of inputs of the structure of data for activating interfaces) that need to be classified relative to one another. Overall, the step for determining a confidence score $P1_{SC}$ comprises the following for a current image and for a current input (Rcrd1, RcdN) of the structure of data for activating transactional interfaces:

- determining (DS10) a number of finger portions (nbdgts) present on said current image, delivering a first value of number of finger portions (nbdgts);
- determining (DS20) a position of finger portions (posdgts) present on said current image delivering a second value of position of finger portions (nbdgts);
- assigning (DS30) a score ($P1_{SC}$) to the current input (Rcrd1, RcdN) of the structure of data for activating transactional interfaces as a function of the first and second values determined earlier.

The two determining steps (DS10, DS20), can be implemented independently or jointly and (and thus constitute one and the same step).

Thus, if the image (or the series of images) enables detection of only one finger portion (a forefinger) situated laterally beneath the card, the probability that the card will be used for inserted into the smartcard reader is high. Indeed, to be able to insert the card into the smartcard reader, it is necessary to hold it firmly and to guide it precisely, a gesture that requires the use of the thumb on the upper face of the card (at the position in which the chip of the smartcard is situated), while placing the forefinger beneath it in order to be able to hold it. Besides, from the viewpoint of the image collected by the terminal (it may be recalled that the image-capturing device is at a fixed position, on the front face of the terminal), the fingers are positioned in a well-defined position of the image (at the bottom of the image if it is assumed that the capturing device orients the image so that the smartcard reader is placed at the bottom of the image). The recognized finger (generally the forefinger) is therefore placed at the bottom of the image (or the series of images) probably involving the use of the smartcard reader.

Conversely, when the user intents to use the contactless interface of the payment card, the inventors have observed that the user tends to place his fingers in the same way as he does for the use of the smartcard reader with, however, the notable difference in which these fingers are placed to the left or to the right of the screen, chiefly because it is necessary, in order to make such a payment, to "attach" (place) the card on or in proximity to the screen of the terminal. Now since the terminal is chiefly of an elongated shape, it is necessary to orient the card perpendicularly to it to be able to place it on or in proximity to the screen of the terminal. Thus, in this scenario, the position of the fingers on the image (or on the series of images) is situated to the left or to the right of it (again relative to the reference defined by the image-capturing device of the terminal. Such a position probably implies the use of the contactless payment interface by means of a payment card having this technology available.

During the use of the magnetic stripe (for example for an American type credit card that still uses this payment means, Amex® or again in-store payment cards (for example cards issued by Galerie Lafayette®, Printemps®, Bloomingdale®, Macy's®, etc.)), the card is presented to the magnetic reader on the edge, implying that it is almost invisible with, on the contrary, very clear visibility firstly of the forefinger that holds the edge of the card and secondly the thumb and the middle finger that grip it in order to give it a movement of translation so that the magnetic stripe can be read by the magnetic head of the reader. Thus, in this scenario, the position and the number of fingers probably involves the use of the magnetic stripe read interface.

The use of communications terminals (of a smartphone type) to carry out payments is expanding very substantially. This use makes it necessary for the payment terminal to adopt a behavior different from that adopted when a payment card is used (it is not part of the object of the present invention to explain the details of these differences of processing; however since the payment terminal is not a payment card, it does not benefit from the same processing system to implement this payment, within the payment terminal). A communications terminal is a heavier object than a payment terminal. Besides, it uses mainly the contactless communications interface to send and receive data to and from the payment terminal. Thus, the user presents his terminal in a flat position generally holding it with one hand in positioning the thumb on one side of the terminal and the other four fingers on the other side. Thus, in this scenario, the position and the number of fingers probably involves the use of the contactless reading interface in the context of a payment transaction made by means of a smartphone type communications terminal.

Thus, the possible scenarios are associated with the scores coming from the detection and recognition of fingers or finger portions coming from the capturing of images made by the characterizing module. Since the detection and the recognition are not necessarily precise or at least since the characterization is not undeniable, a score is associated with each scenario identified, this score being, as indicated here above, used to activate the different payment interfaces one after the other, starting with the highest score (i.e. the most probable situation).

Technically, the implementation of the detection and the recognition is done by any appropriate means as a function of the processing capacities of the terminal or of the device used to implement the proposed method. The detection and the recognition can comprise, preliminarily, a correction of the image (or of the series of images) according to the known position of the optical sensor so as to obtain an image that is corrected (spatially and/or at the level of the colors and/or contrast) to obtain an image under reference processing conditions. The corrections implemented can for example comprise the changing of referential systems, rotation, translation, passage to black and white (or grey levels) and can take account of the characteristics of the image sensor and especially of the lens used (fisheye type lens) making it possible to obtain a panoramic but deformed image. The image obtained under reference conditions, called a rectified image, is in this example the image on which the characterization is done.

In at least one embodiment, the detection and/or the recognition is done by means of at least one neural network, specifically trained beforehand for one or more scenarios such as those described here above, and other examples not necessarily described.

As a complement or in substitution, a technique based on the use of templates can also be implemented. More particularly, the characterizing of the number and the position of the fingers in the image (or the series of images) is determined totally or partially by the use of static or dynamic templates (modules). The original image (or rectified image) is compared with these templates. The image and the templates include for example common reference points (i.e. locations of the ceiling light fixtures for example or other characteristics making it possible to have available known points that are fixed or variable), and the template is compared with the image (for example by superimposition, difference). The image resulting from the comparison is then analyzed: especially a comparison between the presence or absence or fingers or finger portions is made on the image obtained.

Thus, in this embodiment, a template comprises known reference points. The known reference points are used to make the image of the sensor correspond to the template. The template comprises zones of interest (for example zones where the fingers can be located). Once the image is adjusted to the template, the information included in these zones of interest is extracted to determine the presence or absence of fingers or of finger portions. In the event of a correspondence (total or partial), a value is assigned to this template, which corresponds to one or more scenarios. The set of values assigned for templates corresponding to one scenario makes it possible to obtain a score corresponding to this scenario (or a component of this score). This operation is carried for all the templates available (several templates can correspond to a single scenario) and this can be done for all or part of the scenarios (and therefore for the number of inputs of the structure of data for activating interfaces). The static templates can be pre-configured in the terminal.

A dynamic template depends on the use, in real conditions, of the terminal and can be determined during the first use of the terminal (or its configuration), for example to approximate local behaviors of use associated with particular situations. The working of the dynamic templates is identical, in their principle, to those of the static templates.

As explained, the specific detection module can implement both smart detection based on neural networks and a detection based on templates and carry out a combination of the results obtained, and this can be done to have more precise results available if necessary.

5.3. Detection of the Type of Payment Means

In at least one embodiment, in addition to (or in place of) at least one of the scenarios for which a search is made in the selection of the payment mode, the selection module obtains at least one image (and/or video) coming from the management module for managing the image capturing component. This image or these images are used by the selection module to carry out a recognition test described with reference to FIG. 3. The object of this recognition test is to enable a pre-processing of the payment means used (by a pre-processing module). For example, the selection module strives to recognize the type of card used to make the payment. In another example, the detection module strives to recognize the type of payment card used (for example a credit card, a debit card). In yet another example, the selection module detects and recognizes the transmitter of the card (for example Visa®/MasterCard®/Amex®). In yet another example, the selection module recognizes a type of card (for example loyalty card, payment card, etc.).

Figure 3:
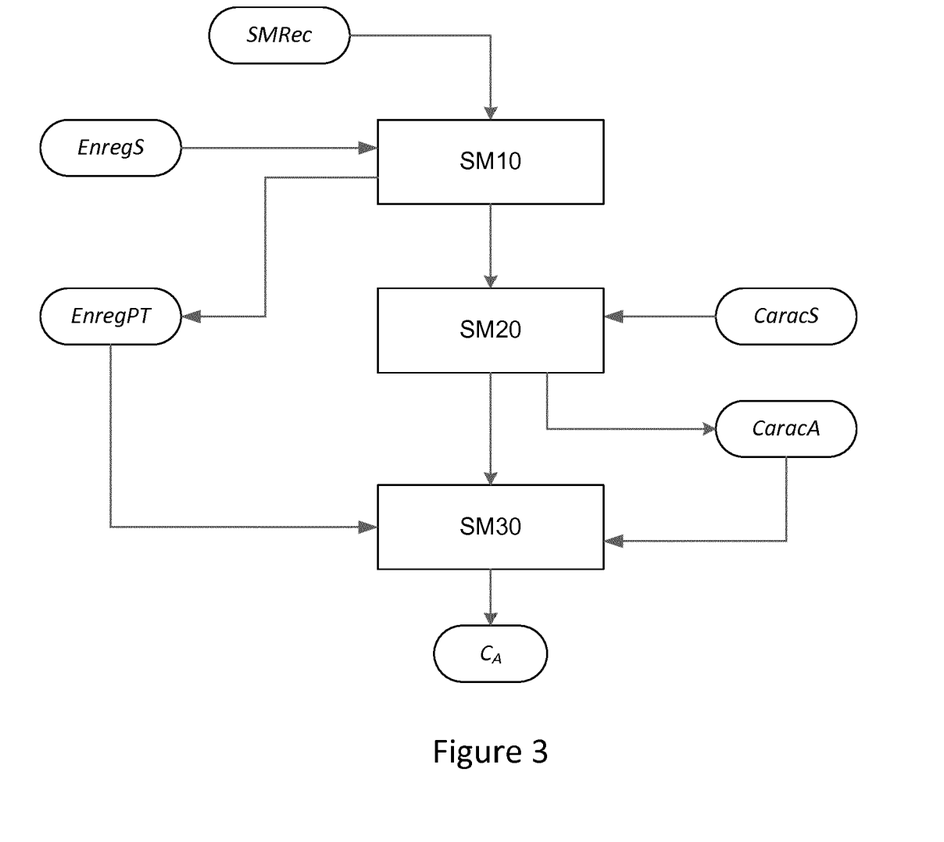
FIG. 3 explains the step for determining a type of transactional device.

More particularly, referring to FIG. 3, the image or images of the payment means (EnregS) are transmitted to a recognition sub-module (SMRec) which for example will detect and recognize certain characteristics of the object presented before the payment terminal. The method implemented for a given image is the following and it comprises:
- a pre-processing step (SM10) for pre-processing the transmitted image (Enreg) delivering a pre-processed image (EnregPT) (for example rectified relative to a known geometrical context of the optical sensor—parallax connection, a passage into black and white—or grey levels, etc.);
- a step (SM20) for obtaining, from among a set of characteristics (CaracS), at least one characteristic (CaracA) to be sought;
- a step (SM30) of searching for said at least one characteristic (CaracA) on said processed image (EnregPT) delivering a value ($C_A$) representative of the presence of said at least one characteristic (CaracA).

The value ($C_A$) representative of the characteristic is then used to make a computation of confidence scores relative to the type of card (or transactional device) that is probably brought closer by the user, as described here below.

In the case of a logo, for example a "contactless" logo, that is present on the front face of the card, the information on presence or absence of this logo is kept in memory to be thereafter used to determine confidence scores associated with the different scenarios studied.

$c_i$ denotes a characteristic being searched for, $c_i$ belonging to a set EGRech of characteristics being searched for $[c_0, \ldots c_n,]$, each characteristic being associated with a weight. This set of characteristics being searched for EGRech comprises several sub-sets of characteristics $[SeRech_0, \ldots, SeRech_n]$, that are disjunctive or not disjunctive wherein the characteristics are distributed. A characteristic $c_i$ can belong to several sub-sets, while a characteristic $c_j$ can belong to only one set.

A part $P2_{SC}$ of the confidence score is computed as a function of a weighted score related to the absence or presence of the characteristics for at least one part of the sub-sets $[SeRech_0, \ldots, SeRech_n]$. For example, if $SeRech_0$ corresponds to the characteristics of a payment card using multiple technologies (smartcard, contactless card and magnetic stripe card) issued by Visa®, the associated characteristics are:
- $c_0$ (card): search for and detect the presence of a card in the image;
- $c_1$ (chip): search for and detect the presence of a chip in the image;
- $c_2$ (contactless): search for and detect the presence of the contactless logo in the image;
- $c_3$ (stripe): search for and detect the presence of a magnetic stripe in the image;
- $c_4$ (Visa®): search for and detect the presence of the Visa® logo in the image.

The probability that this is a payment card using multiple technologies (smartcard, contactless card and magnetic stripe card) issued by Visa® is defined by the following equation:

$$P_{SeRech0} = \frac{\sum_{i=0}^{4} IR_{c_i} \times w_{c_i}}{\sum_{i=0}^{4} w_{c_i}}$$

In which:

$R_{c_i}$ is a score of recognition and/or detection of the characteristic $c_i$ in the image;

$w_{c_i}$ is the weight associated with this characteristic $c_i$.

For MasterCard® or another card-issuing entity, the previous characteristic $c_4$ is replaced by a search for and detection of an equivalent logo. Under operational conditions, several characteristics are searched for and/or recognized in real time in series or in parallel, thus enabling the assignment of scaled scores: the previous characteristics c0 to c3 can first of all be searched for to obtain a first confidence score and then the characteristics c4 (pertaining to the issuing entity) can be searched for thereafter, for example. This makes it possible to spread the computation load over time and have the most important information available at the start of the processing.

Depending on the embodiments implemented, the score $R_{c_i}$ of recognition and/or detection of the characteristic $c_i$ in the image is obtained by implementing a component or a software module intended for one or more characteristics. As explained here above, before the image is given to one of these modules or components, it can be subjected to a set of pre-processing operations, for example processing operations aimed at rectifying the image, rescaling it. These preparatory processing operations mainly have the goal of placing the recognition modules and/or detection modules under the most favorable conditions so that the computations to be made on the image with a view to detection of the characteristics are the fastest possible.

5.4. Implementing Device

Figure 4:
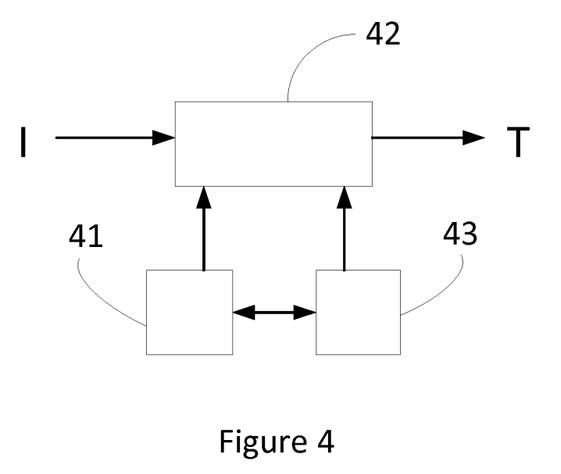
FIG. 4 is a brief description of the device for characterizing in which the present invention can be implemented.

FIG. 4 schematically presents the structure of a terminal according to the present invention. More specifically, FIG. 3 presents the terminal 500 which comprises at least one microprocessor with which there is associated on the one hand a live memory, for example by means of a bus, and on the other hand a non-volatile memory (for example of the EEPROM type) also through a bus. In one variant, the terminal is equipped with a second processor, for example a secure processor, as well as a memory, also a secure memory (volatile memory and/or non-volatile memory).

The terminal can exchange data with external devices (i.e. transactional devices such as a contactless card or an NFC contactless device) using several communications modules (also called transactional modules). More specifically, a first communications module comprises a magnetic read head, a second communications module comprises an electrical contacts interface (for example in compliance with the ISO/IEC 7816 standard). A third communications module can be compatible with at least any one of the following standards: ISO/CEI 18092, ISO/CEI 14443-1 to ISO/CEI 14443-4 and NDEF.

In one embodiment, one (or more) optical sensors (CCD image sensors) are used in conjunction with a command module. Such a command module is connected, via buses, to at least one optical sensor as explained here above and for example to first and second and third communications modules thus enabling the direct control of these communications modules as a function of the data obtained (image/video recordings). The command module comprises the components, modules and applications described here above. According to one variant, a detection module can comprise a plurality of sensors and a plurality of command modules.

According to one variant, the terminal comprises a single command module for controlling all the communications modules and a plurality of sensors distributed in proximity to the communications modules. Such a command module is in interaction with the totality of the sensors. In another embodiment, an application that is executed on a terminal coordinates the operation of the command modules.

More generally, whatever the embodiment, the invention consists in adding a sensor for the recognition or the characterizing of the transactional device in the reading zone of the communications modules. An optical sensor can be used and enables, as compared with other detection techniques, the characterization of the transactional device. This type of optical sensor makes it possible to:

detect the position of the transactional device (via inter alia shape recognition means making it possible to avoid confusion between the position of one hand, or another object, and a position of a transactional device);

put into action the appropriate communications module (for example the contactless reader) solely when it is necessary;

enabling the cohabiting of different types of transactional device readers: tracks, contact chips, contactless chips;

obtain a significant gain in the autonomy of the portable terminals equipped with contactless card readers.

In one variant, a command module can also command a sensor in order to specify the position of the transactional device that has been detected a first time. Be that as it may, referring to FIG. 4, we present an embodiment of a device for characterizing transactional devices as explained here above according to the invention.

Such a device comprises a memory 41 constituted by a buffer memory, a processing unit 42, equipped for example with a microprocessor P, and driven by the computer program 43, implementing the method according to the invention. Such a device can also include a secure memory constituted by a buffer memory and a non-volatile memory, a secure processing unit equipped for example with a microprocessor and driven by the computer program 43 and a sensitive part of this program implementing the method of characterization according to the invention.

At initialization, the code instructions of the computer program 43 are for example loaded into a RAM and then executed by the processor of the processing unit 42. The processing unit 42 inputs at least one piece of information I, such as recordings coming from the optical sensor connected to the characterizing device. The microprocessor of the processing unit 42 implements the steps of the method of characterization described here above, according to the instructions of the computer program 43, to deliver a piece of processed information T, such as confidence scores associated with the different scenarios (processing interfaces) to be used. To this end, the device comprises in addition to the buffer memory 41, the previously described means and especially the modules and components presented here above. These means can be directly integrated into the characterizing device or added to a terminal such as a payment terminal. These means are driven by the microprocessor of the processing unit 42. The components and means described can be secure components, confidence components or components combining secure structures and non-secure structures.

As will have been perfectly understood, the method of characterization as described here above can include a first sub-method of characterization based on the counting and positioning of a number of fingers of a user and a second sub-method of characterization that consists in determining the transactional device used, these two methods being possibly implemented independently of each other.

The invention claimed is:

1. A method for determining a type of transactional device used to carry out a transaction, wherein the method is implemented by an electronic device comprising a data processor, a memory and an optical sensor, and a set of transactional interfaces, and the method comprises:
- obtaining at least one recording coming from the optical sensor, said recording being obtained when a user holds said transactional device in hand;
- determining at least one confidence score, said at least one confidence score being associated with at least one corresponding input of a structure of data for activating transactional interfaces of the set of transactional devices of said electronic device; and
- at least one act of activating at least one transactional interface associated with said at least one input of the structure of data for activating at least one transactional interface of the set of transactional devices of the electronic device as a function of a descending order of value of score of said at least one confidence score.

2. The method according to claim 1, wherein the at least one confidence score is a value representative of a probability of using a given transactional interface on the part of the user holding said transactional device in hand.

3. The method according to claim 1, wherein the determining of at least one confidence score associated with at least one input of the structure of decision data comprises at least one of the following:
- determining a confidence score associated with a number of finger portions present on at least one recording coming from the optical sensor;
- determining a confidence score associated with the transactional device in hand.

4. The method according to claim 3, wherein the determining at least one confidence score comprises the following for a current image and for a current input of the structure of data for activating transactional interfaces:
- determining a number of finger portions present on said current image, delivering a first value of number of finger portions;
- determining a position of finger portions present on said current image, delivering a second value of position of finger portions;
- assigning a score to the current input of the structure of data for activating transactional interfaces as a function of the first and second previously determined values.

5. The method according to claim 3, wherein the determining of a confidence score associated with the number of finger portions present on at least one recording coming from the optical sensor implements at least one previously trained neural network.

6. The method according to claim 3, wherein the determining of the confidence score associated with the number of finger portions present on at least one recording coming from the optical sensor implements at least one recognition template.

7. The method according to claim 2, wherein the determining at least one confidence score comprises, for a current image:
- pre-processing the current image delivering a pre-processed image;
- obtaining, from amongst a set of characteristics, at least one characteristic to be searched for;
- searching for said at least one characteristic on said processed image delivering at least one value representing the presence of said at least one characteristic within said current image.

8. An electronic device for determining a type of transactional device used to carry out a transaction, the electronic device comprising:
- a data processor;
- a memory;
- an optical sensor; and
- a set of transactional interfaces,
- wherein the memory stores instructions which when executed by the data processor configure the electronic device to:
- obtain at least one recording coming from the optical sensor, said recording being obtained when a user holds said transactional device in hand;
- determine at least one confidence score, said at least one confidence score being associated with at least one corresponding input for activating at least one transactional interface of the set of transactional interfaces of said electronic device; and
- activating at least one transactional interface associated with said at least one input of the structure of data for activating transactional interfaces of the set of transactional devices of the electronic device, as a function of a descending order of value of score of said at least one confidence score.

9. The electronic device according to claim 8, wherein the electronic device is comprised in a payment terminal.

10. A non-transitory computer-readable medium comprising program code instructions stored thereon, which when executed by a processor of an electronic device configure the electronic device to:
- determine a type of transactional device used to carry out a transaction by:
- obtaining at least one recording coming from an optical sensor of the electronic device, said recording being obtained when a user holds said transactional device in hand;
- determining at least one confidence score, said at least one confidence score being associated with at least one corresponding input of a structure of data for activating transactional interfaces of a set of transactional devices of said electronic device; and
- at least one act of activating at least one transactional interface associated with said at least one input of the structure of data for activating at least one transactional interface of the set of transactional devices of the electronic device as a function of a descending order of value of score of said at least one confidence score.

* * * * *